US009923455B2

United States Patent
Gong et al.

(10) Patent No.: US 9,923,455 B2
(45) Date of Patent: Mar. 20, 2018

(54) CURRENT-SENSING AND GAIN-SWITCHING CIRCUIT AND METHOD FOR USING WIDE RANGE OF CURRENT

(71) Applicant: Murata Manufacturing Co., Ltd., Nagaokakyo-shi, Kyoto-fu (JP)

(72) Inventors: Bing Gong, Etobicoke (CA); Jahangir Afsharian, Toronto (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/182,975

(22) Filed: Jun. 15, 2016

(65) Prior Publication Data

US 2017/0366098 A1   Dec. 21, 2017

(51) Int. Cl.
*H02M 1/42* (2007.01)
*H02J 3/18* (2006.01)
*H02M 1/00* (2006.01)

(52) U.S. Cl.
CPC ............ *H02M 1/42* (2013.01); *H02J 3/18* (2013.01); *H02M 2001/0009* (2013.01)

(58) Field of Classification Search
CPC .... H02M 1/42; H02M 1/4208; H02M 1/4266; H02M 2001/0012; H02M 2001/0025; H02M 2001/42; H02M 2001/4208; H02J 3/18; H02J 3/01
See application file for complete search history.

(56) References Cited

U.S. PATENT DOCUMENTS

| | | | | |
|---|---|---|---|---|
| 9,184,651 | B2* | 11/2015 | Nguyen | H02M 1/08 |
| 2002/0057125 | A1* | 5/2002 | Demizu | H02M 3/156 |
| | | | | 327/538 |
| 2008/0158914 | A1 | 7/2008 | Bakker | |
| 2015/0035510 | A1* | 2/2015 | Hoshino | H02M 3/157 |
| | | | | 323/283 |

OTHER PUBLICATIONS

Rahman et al., "A Technique to Sense Current for Digitally Controlling a Power Factor Correction Boost Rectifier", 2012 Fourth International Conference on Computational Intelligence, Modelling and Simulation, Sep. 25-27, 2012, pp. 294-298.
Azcondo et al., "Power Factor Correction Without Current Sensor Based on Digital Current Rebuilding", IEEE Transactions on Power Electronics, vol. 25, No. 6, Jun. 2010, pp. 1527-1536.

* cited by examiner

*Primary Examiner* — Kyle J Moody
(74) *Attorney, Agent, or Firm* — Keating & Bennett, LLP

(57) ABSTRACT

A current control circuit includes a current transformer that detects a primary current, a sensor gain switch that selectively connects the primary current to one of a first gain amplifier and a second gain amplifier to provide a current sensing output, a controller gain switch that selectively connects the current sensing output to one of a first controller amplifier and a second controller amplifier, and a controller that controls switching of the sensor gain switch and the controller gain switch.

19 Claims, 4 Drawing Sheets

CURRENT-SENSING AND GAIN-SWITCHING CIRCUIT AND METHOD FOR USING WIDE RANGE OF CURRENT

BACKGROUND OF THE INVENTION

1. Field of the Invention

The present invention relates to current sensing in gain-switching circuits. More specifically, the present invention relates to a current-sensing and gain-switching circuit and a method for using a wide range of currents.

2. Description of the Related Art

Digital control using a microcontroller or digital signal processing (DSP) has become popular for switching-mode power supplies due to the benefits of flexible control, easy integration, and high performance. One example of a switching-mode power supply includes a power factor correction (PFC) converter. A conventional PFC converter includes a diode bridge that provides full-wave rectification of an alternating-current input voltage such that the power-conversion circuitry of the conventional PFC converter always receives a positive-polarity input voltage. The power-conversion circuitry typically includes a boost inductor with an auxiliary winding that is used for demagnetization sensing. The auxiliary winding is coupled to a detection circuit that includes an analog comparator or an integrated circuit (IC) device such as a microcontroller.

FIG. 1 is a diagram of a known example of circuit that uses a current transformer and digital control for power factor correction. As shown in FIG. 1, a PFC converter includes an alternating-current power supply Vin that is connected to a boost inductor L via a diode bridge DB. The voltage from the alternating-current power supply Vin is rectified by the diode bridge DB, boosted using an inductor L, and then provided to a capacitor C. A microcontroller controls the on and off switching of a transistor Q to increase the rectified voltage provided to the capacitor C. A boost diode D ensures that current properly flows from the inductor L to the capacitor C, and that the capacitor C only discharges to the load Rload connected to the output voltage Vo. Terminals PFC V+ and PFC V− are the positive and negative rails for the output voltage Vo.

To perform boost conversion in the PFC converter, it is necessary to properly control the on and off operation of the transistor Q. Particularly, the transistor Q is controlled based upon the on-time determined by a microcontroller and the magnetization state of the boost inductor L to obtain the desired output voltage and input current characteristics. The control of the on and off operation of the transistor Q is performed by a microcontroller that applies digital pulse-width modulation (DPWM) to the gate of the transistor Q based upon voltage and current measurements.

For a digitally-controlled PFC, the current through transistor Q during its on-time is typically sensed to determine the current through the inductor L for current loop control. Specifically, if the transistor Q is a metal-oxide-semiconductor field-effect transistor (MOSFET) as shown in FIG. 1, then the MOSFET current can be sensed by a current transformer (CT), which is a relatively cheap and low-loss solution. Because the signal of the current sensing output Is is provided to an analog-to-digital (A/D) converter (ADC) module of the microcontroller for current measurement, a sensing resistor R1 of the current transformer CT must have a relatively large resistance to utilize the dynamic range of the ADC module. If the sensing resistor R1 has a small resistance, the current measurement resolution of the microcontroller would be low so that total harmonic distortion (THD) of current will be impacted. THD can be high especially at light-load conditions because of large errors in current measurement. Thus, including a large resistance on the secondary side of the current transformer CT can increase the current measurement resolution of the digital controlled PFC boost converter.

However, using a large resistance as the sensing resistor R1 results in a large value of magnetizing flux inside the magnetic core of the current transformer CT. In order to prevent saturation of the core, a larger size core needs to be selected, which increases the difficulty in achieving a small physical size/footprint and high power density design because the larger core increases the size of the sensing circuit, thus decreasing the power density. Accordingly, to ensure the current transformer CT is not saturated, the resistance of the sensing resistor R1 is kept as small as possible to limit the volt-second in one switching cycle, where volt-second is the product of output voltage of the current transformer CT and duration of this voltage in one switching cycle. In addition, a small-size current transformer is preferred for high power density design.

FIG. 2 is a diagram of a known example of a circuit that uses a shunt resistor R_shunt and digital control for power factor correction. As shown in FIG. 2, a PFC converter includes similar components to the PFC converter shown in FIG. 1, except that the current transformer CT has been replaced by a shunt resistor R_shunt. The shunt resistor R_shunt is typically used for low-power applications. Although the shunt resistor R_shunt is shown as being connected in series with the transistor Q, the shunt resistor R_shunt can instead be positioned at a different location in the circuit, such as in series with the inductor L or in the current path of the diode D.

Compared with the current transformer CT shown in FIG. 1, the shunt resistor R_shunt shown in FIG. 2 typically has a lower profile because shunt resistors are typically smaller than current transformers. Although the shunt resistor R_shunt can help achieve high power density, the shunt resistor R_shunt is generally not usable for high-power PFC design (for example, over 1.5 kW), because in high power applications, the shunt resistor R_shunt dissipates a significant amount of power that substantially lessens the efficiency of the PFC converter. One example of a circuit that uses a shunt resistor for current sensing is described in Rahman et al., "A Technique to Sense Current for Digitally Controlling a Power Factor Correction Boost Rectifier," Computational Intelligence, Modelling and Simulation (CIMSiM), 2012 Fourth International Conference on, pp. 294-298, Sep. 25-27, 2012.

Another implementation for PFC converters eliminates current sensing in "current sensorless control." In current sensorless control, the input voltage Vin and the output voltage Vo are detected and used to "rebuild" (estimate) the current according to current estimation algorithms. The current estimation algorithms are calculated by a high-speed digital device, such as a field-programmable gate array (FPGA), an application-specific integrated circuit (ASIC), or a high-speed DSP. However, this solution exhibits many drawbacks, and is generally regarded as impractical in industry design. The accuracy of the rebuilt current is largely dependent upon the accuracy of the measurements of the input voltage Vin and the output voltage Vo, such that current sensorless control is very susceptible to noise. In addition, the cost of high-speed digital device required by current sensorless control easily offsets any cost savings obtained from eliminating the current sensors. One example of a circuit that uses current sensorless control is described in Javier Azcondo et al., "Power Factor Correction Without Current Sensor Based on Digital Current Rebuilding," Power Electronics, IEEE Transactions on, vol. 25, no. 6, pp. 1527-1536, June 2010.

SUMMARY OF THE INVENTION

To overcome the problems described above, preferred embodiments of the present invention provide current measurement in a PFC converter that has high resolution and a small current transformer.

Preferred embodiments of the present invention also provide a current-sensing and gain-switching circuit and a method for using a wide range of currents that achieve high resolution and use a small current transformer.

According to a preferred embodiment of the present invention, a current control circuit includes a current transformer that detects a primary current, a sensor gain switch that selectively connects the primary current to one of a first gain amplifier and a second gain amplifier to provide a current sensing output, a controller gain switch that selectively connects the current sensing output to one of a first controller amplifier and a second controller amplifier, and a controller that controls switching of the sensor gain switch and the controller gain switch.

Preferably, the controller controls the switching of the sensor gain switch and the controller gain switch according to a feedback signal output by the one of the first controller amplifier and the second controller amplifier that is connected to the output of the analog-to-digital converter. The controller preferably outputs a control signal that controls the switching of the sensor gain switch and the controller gain switch in synchronization with one another. A ratio of the gain of the first gain amplifier to the gain of the second gain amplifier is preferably equal to a ratio of the gain of the second controller amplifier to the gain of the first controller amplifier. The analog-to-digital converter, the controller gain switch, and the controller are preferably included in a microcontroller.

The sensor gain switch preferably includes a first transistor that is directly driven by the controller. The first transistor is preferably a logic level metal-oxide-semiconductor field-effect transistor. The sensor gain switch further preferably includes a first resistor directly connected to the primary current and a second resistor connected to the primary current through the first transistor. The sensor gain switch further preferably includes a third resistor connected to the primary current through a second transistor, in parallel with the second resistor and the first transistor.

The current control circuit further preferably includes an analog-to-digital converter that processes the current sensing output, and the controller gain switch selectively preferably connects an output of the analog-to-digital converter to one of a first controller amplifier and a second controller amplifier.

The controller is preferably programmed to provide functions of the controller gain switch, the first controller amplifier, and the second controller amplifier. The controller gain switch, the first controller amplifier, and the second controller amplifier are preferably implemented in a physical circuit.

According to a preferred embodiment of the present invention, a voltage converter includes the current control circuit according various other preferred embodiments of the present invention, a power supply, and an output voltage terminal.

The power supply preferably is an alternating-current power supply, and direct-current power is preferably output at the output voltage terminal. The alternating-current power supply is preferably connected to a diode bridge. The power supply preferably is a direct-current power supply, and direct-current power is preferably output at the output voltage terminal. Preferably, the voltage converter further includes a transistor, and the controller controls the on and off switching of the transistor. The voltage converter preferably is a switching-mode power supply. The voltage converter is preferably a power factor correction converter.

The above and other features, elements, steps, configurations, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described in detail with reference to FIGS. 3 to 6. Note that the following description is in all aspects illustrative and not restrictive and should not be construed to restrict the applications or uses of the present invention in any manner.

Figure 1:
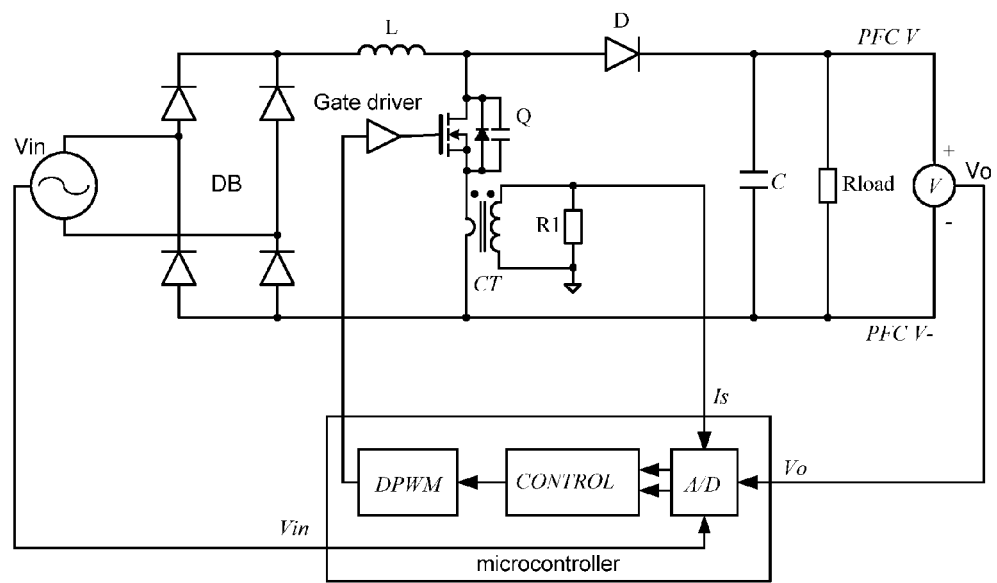
FIG. 1 is a diagram of a known example of a circuit that uses a current transformer and digital control for power factor correction.
Figure 2:
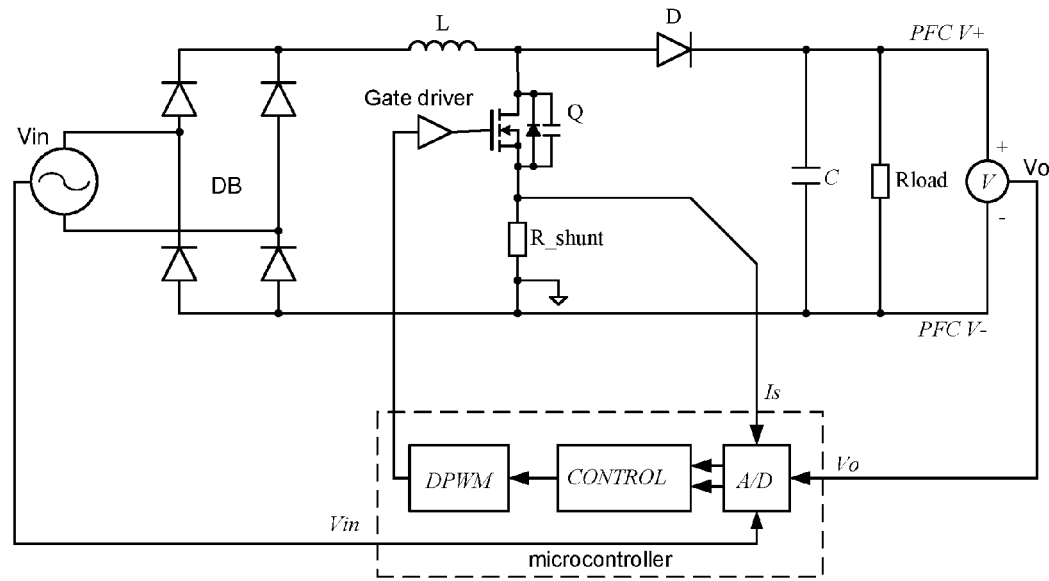
FIG. 2 is a diagram of a known example of a circuit that uses a shunt resistor and digital control for power factor correction.
Figure 3:
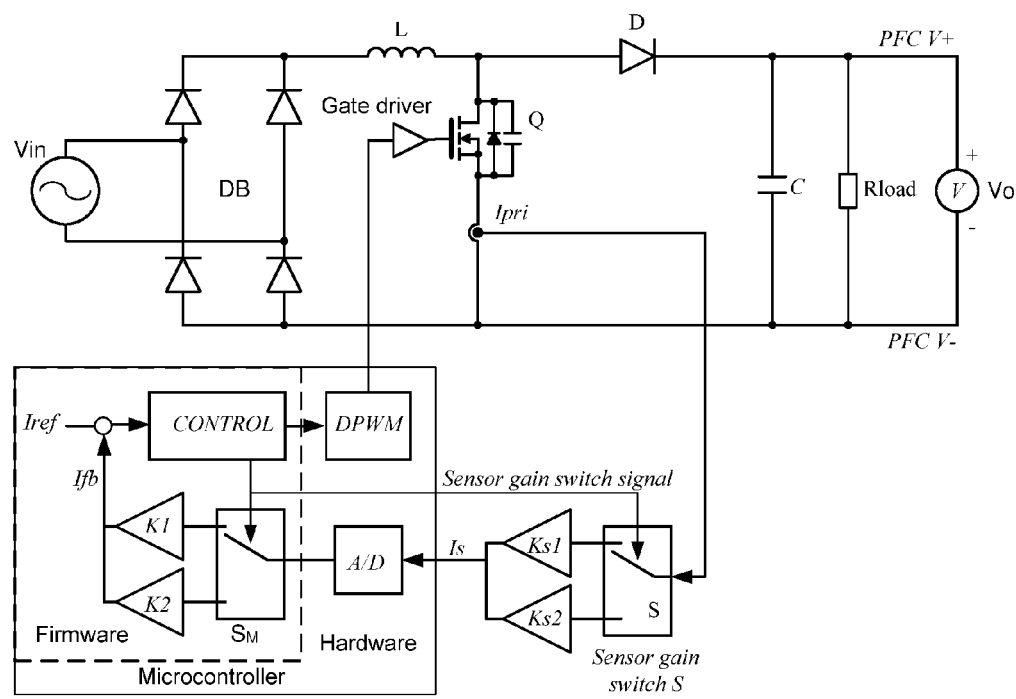
FIG. 3 is a diagram of a circuit including a current control loop with current sensor gain switching according to a preferred embodiment of the present invention.

FIG. 3 is a diagram of a circuit including a current control loop with current sensor gain switching according to a preferred embodiment of the present invention. As shown in FIG. 3, a current sensing signal Ipri sensed from the current flowing through transistor Q is provided to a sensor gain switch S. The current sensing signal Ipri is then selectively provided through either a first sensor gain Ks1 or a second sensor gain Ks2. The first sensor gain Ks1 and the second sensor gain Ks2 can be implemented as shown, for example, in FIG. 5. The sensor gain of the circuit shown in FIG. 5 can be changed by changing the total equivalent resistance at the output of the current transformer CT. For a given primary current Ipri of the current transformer CT and a given turns ratio of the current transformer CT, the sensor output signal Is is proportional to the total equivalent resistance at the output of the current transformer CT.

Figure 5:
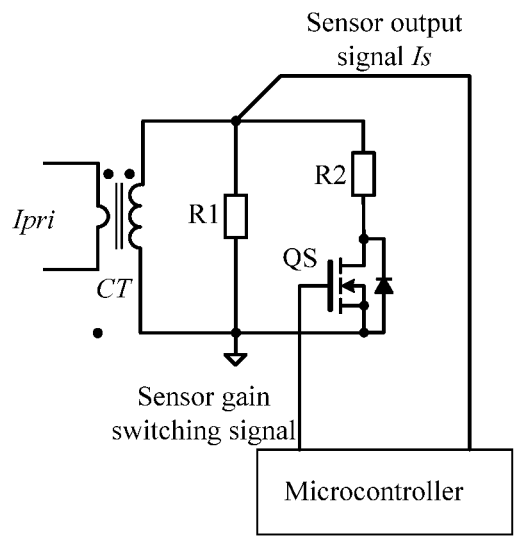
FIG. 5 is a circuit diagram of the sensor gain switch shown in FIG. 3 according to a preferred embodiment of the present invention.

In FIG. 3, when the current sensing signal Ipri is smaller than a threshold current, the sensor gain switch S connects to the first sensor gain Ks1, which has a higher value than the second sensor gain Ks2, to boost the signal of the current sensing output Is to thereby increase the resolution of the current measurement. For example, as shown in FIG. 5, the sensor gain switch S can be switched by providing a simple ON/OFF logic control signal. In FIG. 3, when the current sensing signal Ipri is higher than the threshold current, the sensor gain switch S connects to the second sensor gain Ks2, which has a lower value than the first sensor gain Ks1, to reduce the maximum flux density in the current transformer CT core (although not shown in FIG. 3, a current transformer CT is included as shown, for example, in FIGS. 5 and 6) to avoid saturation. The threshold current preferably is selected so that the maximum flux density in the current transformer CT core is always within a region in which the current transformer CT core is not saturated. In addition, hysteresis can be added to the threshold current to increase the noise immunity in the detection circuit. Thus, by switching between the first sensor gain Ks1 or the second sensor gain Ks2 according to the threshold current, high-resolution current sensing can be achieved with a small current transformer CT core.

Because sensor gain (from either the first sensor gain Ks1 or the second sensor gain Ks2) is part of the current control loop, as shown in FIG. 3, the sensor gain affects the total loop gain when it changes between the first sensor gain Ks1 or the second sensor gain Ks2. More specifically, the first sensor gain Ks1 or the second sensor gain Ks2 represents the gain Is/Ipri, when the sensor gain switch S is either OFF or ON, respectively. Therefore, when switching between the first sensor gain Ks1 and the second sensor gain Ks2, a large transient can occur which can disturb the current control. Thus, to provide a seamless transition between the first sensor gain Ks1 and the second sensor gain Ks2, additional gain switching between the first microcontroller gain K1 and the second microcontroller gain K2 inside the microcontroller is used to offset the effect of the external sensor gain switch S. Switching of the gain between the first microcontroller gain K1 and the second microcontroller gain K2 by a microcontroller switch $S_M$ is synchronized with the sensor gain switch S, which is external to the microcontroller. The switch $S_M$, the first microcontroller gain K1, and the second microcontroller gain K2 can be implemented as software in the microcontroller, as shown by the box with dashed lines labeled as firmware in FIG. 3. The microcontroller can be programmed to provide the functions of the switch $S_M$, the first microcontroller gain K1, and the second microcontroller gain K2. Alternatively, the switch $S_M$, the first microcontroller gain K1, and the second microcontroller gain K2 can be implemented as a physical circuit.

Preferably, the first microcontroller gain K1 and the second microcontroller gain K2 are selected based on the relationship of:

$$\frac{K1}{K2} = \frac{Ks2}{Ks1}. \quad (1)$$

Accordingly, the gain of the feedback signal Ifb output by the microcontroller gain over Ipri (Ifb/Ipri) remains unchanged such that the total loop gain of the control loop remains unchanged as well.

Figure 4:
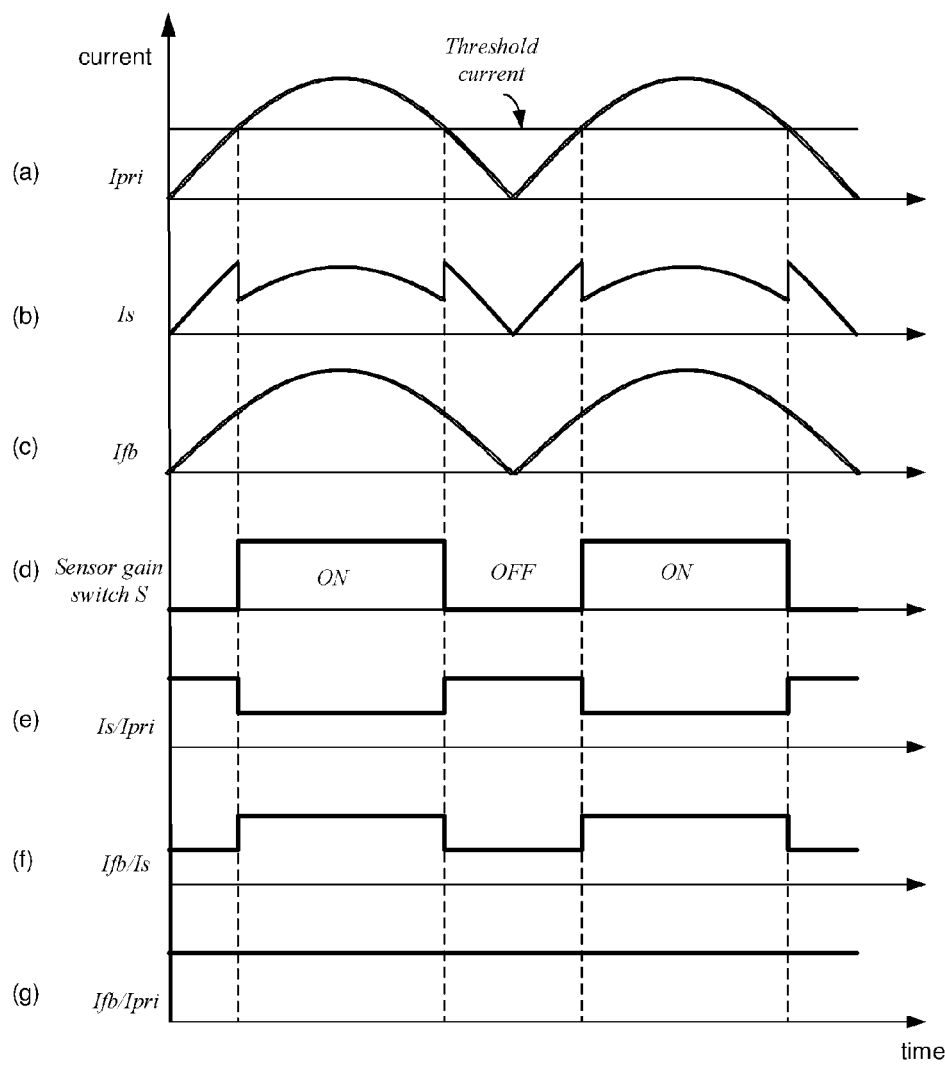
FIG. 4 shows various graphs of waveforms for the circuit shown in FIG. 3.

FIG. 4 shows various graphs of waveforms, with respect to time, for the circuit shown in FIG. 3, including: (a) Ipri; (b) the current sensing output Is; (c) the feedback signal Ifb; (d) ON/OFF state of the sensor gain switch 5; (e) the gain of the current sensing output Is over Ipri (Is/Ipri); (f) the gain of the feedback signal Ifb over the current sensing output Is (Ifb/Is); and (g) the gain of the feedback signal Ifb over Ipri (Is/Ipri).

As shown in FIG. 4, the maximum value of the current sensing output Is is reduced relative to the current sensing output Is due to the gain switching scheme shown in FIG. 3, while the feedback signal Ifb for current control is not affected, such that the overall control of the gate of the transistor Q is not disturbed.

FIG. 5 is a circuit diagram of the sensor gain switch S shown in FIG. 3, according to a preferred embodiment of the present invention. As shown in FIG. 5, the sensor gain switch S can be implemented using a logic level MOSFET switch QS which is directly driven by the microcontroller shown in FIG. 3. In FIG. 5, the sensor gain switch S includes two resistors R1 and R2 at the current transformer CT secondary side. Resistor R1 is connected to the current transformer CT permanently, and resistor R2 is connected to the current transformer CT through the sensor gain switch S. As shown in FIG. 4, the switch QS turns on when the primary current Ipri is greater than the threshold such that the current sensing output Is of the current transformer CT is reduced to avoid saturating the current transformer CT at high currents. The first microcontroller gain K1 and the second microcontroller gain K2 need to be switched accordingly to maintain the relationship between the feedback signal Ifb and the primary current Ipri unchanged. Resistors R1 and R2 can have any value. As an example, if resistors R1 and R2 have the same value, then, when switch QS is closed, the voltage of the sensor output signal Is is reduced by half. Then, K2 should equal to 2*K1 to maintain the feedback signal Ifb unchanged.

Figure 6:
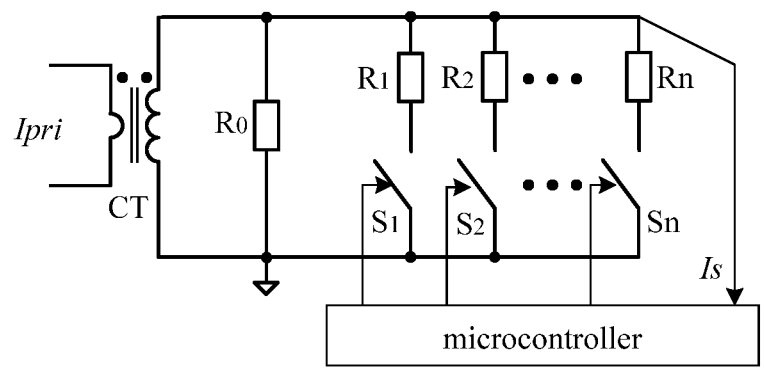
FIG. 6 is a circuit diagram showing a generalized sensor gain switching scheme for the sensor gain switch shown in FIG. 3 according to a preferred embodiment of the present invention.

FIG. 6. is a circuit diagram showing a generalized sensor gain switching scheme for the sensor gain switch S shown in FIG. 3 according to a preferred embodiment of the present invention. In particular, the gain Is/Ipri can include more than one switching step to obtain finer step changes (higher granularity) to ensure a high dynamic range of the ADC. More switching steps can achieve higher resolution at light-load conditions, while reducing the risk of saturation in the current transformer CT core at high load.

The preferred embodiments of the present invention can be used with various circuit topologies, including ones other than the boost converter for PFC. For example, the preferred embodiments of the present invention can be used for primary current sensing of a LLC converter.

In addition, the preferred embodiments of the present invention can be used to detect the current at the source or the drain of the switch used in a boost converter, or can be located at any other suitable position for detecting current.

Furthermore, in the circuit diagram of the sensor gain switch S shown in FIG. 5, resistors R1 and R2 are not necessarily single resistors, and can each include two or more resistors in parallel or in series, for example.

The preferred embodiments of the present invention can be used in for both AC/DC converters and DC/DC converters.

A current sensor gain switching scheme according to the preferred embodiments of the present invention increases current measurement resolution without creating a saturation problem in a current transformer and without increasing the size of the current transformer. Accordingly, current sensing for AC/DC converters and DC/DC converters can be efficiently provided. In particular, a low cost microcontroller with a low resolution ADC can be used with the preferred embodiments of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A current control circuit comprising:
   a current transformer that detects a primary current;
   a sensor gain switch that selectively connects the primary current to one of a first gain amplifier and a second gain amplifier to provide a current sensing output;
   a controller gain switch that selectively connects the current sensing output to one of a first controller amplifier and a second controller amplifier; and
   a controller that controls switching of the sensor gain switch and the controller gain switch.

2. The current control circuit according to claim 1, wherein the controller controls the switching of the sensor gain switch and the controller gain switch according to a feedback signal output by the one of the first controller amplifier and the second controller amplifier that is connected to the current sensing output.

3. The current control circuit according to claim 1, wherein the controller outputs a control signal that controls the switching of the sensor gain switch and the controller gain switch in synchronization with one another.

4. The current control circuit according to claim 1, wherein a ratio of the gain of the first gain amplifier to the gain of the second gain amplifier is equal to a ratio of the gain of the second controller amplifier to the gain of the first controller amplifier.

5. The current control circuit according to claim 1, wherein the controller gain switch and the controller are included in a microcontroller.

6. The current control circuit according to claim 1, wherein the sensor gain switch includes a first transistor that is directly driven by the controller.

7. The current control circuit according to claim 6, wherein the first transistor is a logic level metal-oxide-semiconductor field-effect transistor.

8. The current control circuit according to claim 6, wherein the sensor gain switch further includes a first resistor directly connected to the primary current and a second resistor connected to the primary current through the first transistor.

9. The current control circuit according to claim 8, wherein the sensor gain switch further includes a third resistor connected to the primary current through a second transistor, in parallel with the second resistor and the first transistor.

10. The current control circuit according to claim 1, further comprising an analog-to-digital converter that processes the current sensing output; wherein
   the controller gain switch selectively connects an output of the analog-to-digital converter to one of the first controller amplifier and the second controller amplifier.

11. The current control circuit according to claim 1, wherein the controller is programmed to provide functions of the controller gain switch, the first controller amplifier, and the second controller amplifier.

12. The current control circuit according to claim 1, wherein each of the controller gain switch, the first controller amplifier, and the second controller amplifier is a distinct physical circuit in the current control circuit.

13. A voltage converter comprising:
   the current control circuit according to claim 1;
   a power supply; and
   an output voltage terminal.

14. The voltage converter according to claim 13, wherein the power supply is an alternating-current power supply, and direct-current power is output at the output voltage terminal.

15. The voltage converter according to claim 14, wherein the alternating-current power supply is connected to a diode bridge.

16. The voltage converter according to claim 13, wherein the power supply is a direct-current power supply, and direct-current power is output at the output voltage terminal.

17. The voltage converter according to claim 13, further comprising:
   a transistor; wherein
   the controller controls the on and off switching of the transistor.

18. The voltage converter according to claim 13, wherein the voltage converter is a switching-mode power supply.

19. The voltage converter according to claim 13, wherein the voltage converter is a power factor correction converter.

* * * * *